Feb. 6, 1962 J. G. ALLEN 3,020,322
ISOMERIZATION OF HYDROCARBONS
Filed Oct. 19, 1959
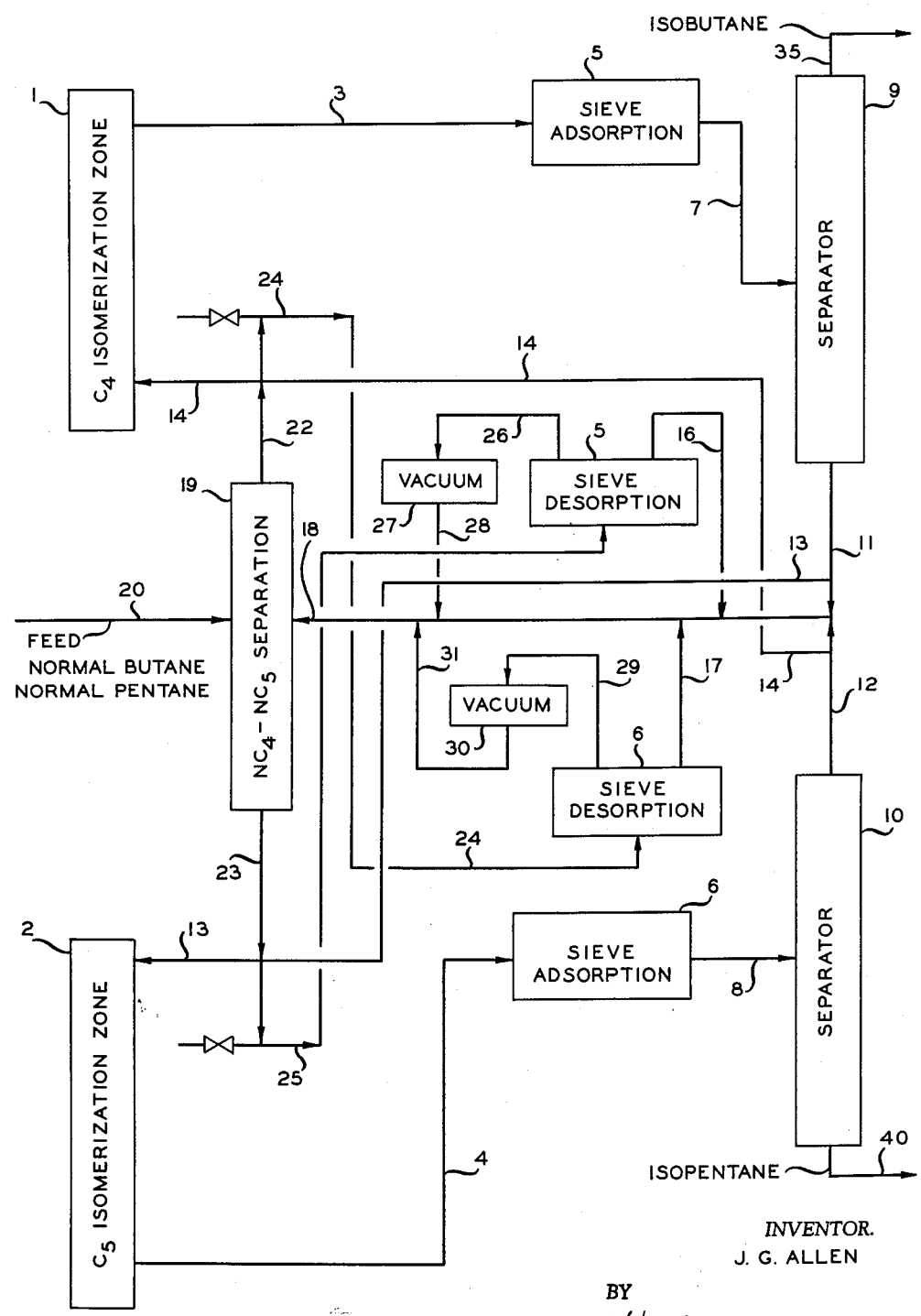
INVENTOR.
J. G. ALLEN
BY
*Hudson & Young*
ATTORNEYS

United States Patent Office 3,020,322
Patented Feb. 6, 1962

3,020,322
ISOMERIZATION OF HYDROCARBONS
John G. Allen, Bartlesville, Okla., assignor to Phillips Petroleum Company, a corporation of Delaware
Filed Oct. 19, 1959, Ser. No. 847,401
2 Claims. (Cl. 260—683.65)

This invention relates to the isomerization of hydrocarbons. In one of its aspects, the invention relates to a novel arrangement of apparatus means for separately isomerizing hydrocarbon streams of different molecular weights and recovering separately isomers thus produced, the apparatus in one form comprising a means for isomerizing a lower molecular weight normal paraffin, a further means for isomerizing a normal paraffin of higher molecular weight, means in combination with each of said isomerization means for recovering separately isomers from the effluent of each isomerization zone, a common separation means for separating isomerized and non-isomerized hydrocarbons and for separating also the hydrocarbons according to molecular weight, means for conveying from said common separation means higher molecular weight normal paraffin recovered from the isomer resulting from the means for isomerizing higher molecular weight normal paraffin, to the isomer recovering means, in which the lower molecular weight normal paraffin isomerized stream isomer is recovered, for removing therefrom un-isomerized paraffin of lower molecular weight retained therein, means for conveying from said common separation means un-isomerized normal paraffin of lower molecular weight to the isomer separation means in which isomer of higher molecular weight has been recovered to remove therefrom un-isomerized normal paraffin of lower molecular weight, and means for conveying from each of said isomer recovering zones the recovered un-isomerized hydrocarbons together with the streams used to recover them to said separation zone. In another of its aspects, the apparatus of the invention provides in lieu of the means required to convey the un-isomerized hydrocarbons, of higher and lower molecular weights, respectively, to the isomer recovery zones, in which the un-isomerized hydrocarbons of lower and higher molecular weights have been separated from the isomer, etc., means for removing the un-isomerized hydrocarbons from said isomer recovery zones by means of a reduced pressure. In a further aspect of the invention there is provided a method wherein hydrocarbons of different molecular weights are, each of them, separately isomerized, isomerized streams are passed to separate molecular sieves, causing adsorption on the sieves, respectively, of insufficiently isomerized hydrocarbon, obtaining isomerized hydrocarbon streams removed as product of the method, recovering insufficiently isomerized hydrocarbon from each of the sieves by using un-isomerized or insufficiently isomerized hydrocarbon of different molecular weights which can be a portion of the feedstock to that zone in which a hydrocarbon of molecular weight different from that on the sieve is to be isomerized, and passing recovered un-isomerized or insufficiently isomerized hydrocarbon from each of the sieves together with the eluent used to a common un-isomerized hydrocarbon separation zone wherein un-isomerized hydrocarbons are separated according to molecular weight to yield the feedstocks for the isomerization zones and the eluents for the respective molecular sieve zones employed. In a still further aspect of the invention, in lieu of the use of eluents in the molecular sieve zones, a suction or vacuum or reduced pressure can be applied to each of said zones causing them to yield the non-adsorbed, insufficiently isomerized hydrocarbon which then is conveyed from each of said zones to the common separation zone.

In the isomerization of hydrocarbons, in which steps are provided to isomerize hydrocarbons according to molecular weight, either by isomerizing a hydrocarbon fraction containing several hydrocarbons within a given molecular weight range and separately isomerizing another fraction of hydrocarbons in a different molecular weight range or by isomerizing as far as possible individual hydrocarbons of different molecular weights in separate zones, there must needs be employed according to prior art practice expensive fractionation equipment which, according to this invention, has been substantially reduced if not altogether eliminated. As apparent from this disclosure, I have conceived that by separately contacting the isomerization reactor effluent with a molecular sieve adapted to recover insufficiently isomerized hydrocarbon I can then recover in a unitary operation, with elimination of considerable fractionation equipment, insufficiently isomerized hydrocarbons for reuse in the isomerization zone by providing a common insufficiently or un-isomerized hydrocarbon separation zone. This zone, as described herein, is preferably a fractionation zone in which the hydrocarbons are separated according to principles of distillation, which are well known. However, it will be obvious to one skilled in the art in possession of this disclosure and having studied the same that the combination of the several steps of the invention can be operated within the scope of the appended claims by replacing the fractionation zone or distillation zone with a solvent extraction zone or other separation zone in which essentially the same separation, which one step of the combination of the invention calls for, is practiced.

A common separation zone according to a concept of the invention provides, when a reduced pressure is used to recover un-isomerized hydrocarbons from the molecular sieve, the individual feedstocks of insufficiently isomerized hydrocarbon for the isomerization zone. When un-isomerized hydrocarbon of molecular weight different from that which is on the sieve is used to recover un-isomerized hydrocarbon from the sieve then the common separation zone of the invention provides eluents, as described in detail herein.

It is an object of this invention to provide a method for the isomerization of hydrocarbons. It is another object of this invention to provide an apparatus for the isomerization of hydrocarbons. It is a further object of this invention to provide a unitary combination of method steps and means for the isomerization of hydrocarbons of different molecular weights. It is a further object of this invention to provide for the recovery of insufficiently isomerized hydrocarbons separately from isomer-containing isomerization zones in which hydrocarbons of different molecular weights have been isomerized. A further object still of the invention is to provide for a minimum of fractionation equipment which is expensive, yet to recover efficiently from various zones of the method and/or various parts of the apparatus insufficiently isomerized hydrocarbons or un-isomerized hydrocarbons for reuse in the isomerization zones.

Other aspects, objects, and the several advantages of this invention are apparent from a study of this disclosure, the drawing, and the appended claims.

According to the present invention, there is provided in the unitary combination of steps a method of isomerizing hydrocarbons neatly permitting the isomerization in separate zones of separate and different streams of hydrocarbons, each under conditions optimum for it while the effluents from each of said zones can be treated economically to recover isomers from each effluent stream upon a molecular sieve material from which the non-isomerized or normal hydrocarbon is recovered, together with some unavoidably adsorbed isomer and returned to the appropriate isomerization zone by way of a common fractionation zone for ultimate recovery in the isomer product; the removal from the sieve material of the non-isomerized or paraffin hydrocarbon being practiced by drawing a vacuum on the sieve materials in one embodiment and in another, the now preferred embodiment, by utilizing the normal paraffin or insufficiently isomerized hydrocarbon of a higher molecular weight to desorb the sieve containing the hydrocarbon of relatively lower molecular weight and vice versa.

The conditions of isomerization of normal paraffin containing hydrocarbon streams are well known and need not here be repeated. The nature of molecular sieve materials is also well known, for example, there can be used Linde type 5–A molecular sieve which is fully described in the art now available. This sieve material is known to selectively adsorb straight-chain paraffin from mixtures containing them and branched-chain paraffins. The isomerization of separate and different hydrocarbon streams is also well known. The invention here described and sought to be protected is based upon a new and unsuggested economical manner of procedure or modus operandi, the concept of which has occurred to me, as above stated, has resulted in considerable savings of fractionation equipment because the concept provides the eluents for both or all of a plurality of sieves, at least one of which, independently of the other, services an isomerization effluent in one embodiment, and in another, provides for the single zone or tower for hydrocarbon fractionation.

Referring now to the drawing, it will be described in connection with a specific example in which $C_4$ and $C_5$ paraffin hydrocarbon-containing streams are isomerized in isomerization zones 1 and 2, respectively. In lieu of the streams used for purposes of setting forth the specific example now being described, there can be isomerized hydrocarbon fractions of different molecular weight ranges. When normal paraffin eluent to recover unisomerized hydrocarbon from the sieve material is used, care must be taken to select the molecular weight range so that adequate recovery can be practiced. Thus, it is necessary that the molecular weights be such that desorption can be practiced and the separation in the separation zone of the various eluents and recovered unisomerized hydrocarbons can be effected when the form of the invention, in which a reduced pressure is used for the desorption, is practiced, then the molecular weight ranges are selected to give desired results in the separation zone and there is less concern with molecular weight with respect to the sieves, since only the effluent from the isomerization zone will be contacted with the sieve.

Normal butane and normal pentane are isomerized in zones 1 and 2 to yield by way of pipes 3 and 4 to molecular sieve separation zones 5 and 6, respectively, a stream containing n-butane and isobutane and a stream containing n-pentane and isopentane. On the adsorption cycle of each of said zones there is yielded by way of pipes 7 and 8 a stream containing essentially isobutane and a stream containing essentially isopentane, respectively. As one skilled in the art will understand, the streams in pipes 7 and 8 unavoidably will contain some of the higher and lower molecular weight hydrocarbons used in the respective sieve zones when these zones are on desorption, with the different molecular weight hydrocarbon used to desorb the adsorbed un-isomerized paraffin. To this end, there are provided separation zones 9 and 10 in which, respectively, n-pentane is separated from isobutane and n-butane is separated from isopentane. The separated n-paraffins are returned by pipes 11 and 12 and 13 and 14 to zones 2 and 1, respectively. Zones 9 and 10 separate out only a small percentage of n-paraffin from product and are provided relatively cheaply for the sieve zones 5 and 6 when these are on desorption cycle. Normal paraffin eluent which in zone 5 is pentane and in zone 6 is butane and the desorbed normal paraffin which in zone 5 is butane and which in zone 6 is pentane are passed by pipes 16 and 17 and pipe 18 to n-pentane and n-butane separation zone 19 to which, if desired, some or all of the feed of n-butane and/or n-pentane can be originally fed by way of pipe 20 and to which also can be fed the n-butane and n-pentane removed from zones 9 and 10 by way of pipes 11 and 12 by passing these hydrocarbons into pipe 18. In separation zone 19 which, in this embodiment, is a distillation zone there is obtained overhead n-butane by pipe 22 and as bottoms, n-pentane by pipe 23. These streams are feed, respectively, to zones 1 and 2 by way of pipes 14 and 13, respectively. Normal butane can be introduced to the system as desired by pipe 24 and n-pentane can be introduced to the system by pipe 25 and these streams can be passed to zones 1 and 2, respectively, by way of pipes 14 and 13, respectively, and/or to zones 5 and 6, respectively, to regenerate these zones during regeneration cycle.

When in lieu of n-paraffin eluent of different molecular weight a vacuum is employed, the removed unconverted, insufficiently isomerized hydrocarbon passes by pipe 26, vacuum and pumping zone 27 and pipe 28 and by pipe 29, vacuum pumping zone 30 and pipe 31 to pipe 18 and thence to separation zone 19.

It will be understood by one skilled in the art in possession of this disclosure that various valves, pumps, controlling equipment, etc., are necessarily omitted from a diagrammatic illustration as here described for sake of simplicity. To the extent that some conditions of operation are given for convenience and description, these are not to be taken as inclusive or exclusive of conditions which one skilled in the art can routinely determine when he has studied this disclosure and appreciate the concepts here set forth.

The operation illustrated in the following tabulation shows the embodiment wherein eluents are used to strip the sieve zones, when these zones are on desorption cycle. The volume ratio of eluents to adsorbates are, in the example, about 6 to 1, at a temperature of 300° F.

Desorption, using an eluent, can range, for example, in temperature from about 200° F. to 650° F., the higher the temperature, the less eluent being required, as is known to those skilled in the art.

When utilizing a vacuum means for desorption, the eluents 24 and 25 can be eliminated. The following tabulation does not directly illustrate the embodiment using vacuum stripping; however, one skilled in the art, in not utilizing eluent lines 24 and 25, can readily see how the material balance would be affected; the end result of isomer products being the same as that in the illustrated embodiment.

SIEVE OPERATIONS

Sieves 5 and 6:
    Adsorption steps—
        Pressure, p.s.i.g. _____ 100
        Temperature, ° F. _____ 90
    Desorption steps—
        Pressure, p.s.i.g. _____ 50
        Temperature, ° F. _____ 300
        Vol. eluent/adsorbate _____ 6:1

ISOMERIZATION OPERATION $C_4$ isomerization (zone 1)—
    Pressure, p.s.i.g. _____ 250
    Temperature, ° F. _____ 190
    Catalyst _____ ([1])
    Conversion, percent _____ 50
$C_5$ isomerization (zone 2)—
    Pressure, p.s.i.g. _____ 250
    Temperature, ° F. _____ 180
    Catalyst _____ ([1])
    Conversion, percent _____ 50

[1] HCl-activated aluminum chloride.

It is noted that HCl-activated aluminum chloride is used in both operations of the example; however, other catalysts, known in the art, can be used, each isomerization zone being operated at optimum conditions for optimum production of each isomer.

*Tabulation*

[Using eluent]

| Component B/H | (20) | (18) | (22) | (14) | (24) | (3) | (7) | (11) | (35) | (23) | (13) | (25) | (4) | (8) | (12) | (40) | (16) | (17) |
|---|---|---|---|---|---|---|---|---|---|---|---|---|---|---|---|---|---|---|
| iC$_4$ | | 4 | 4 | 1 | 3 | 51 | 50 | | 50 | | | | | | | | 1 | 3 |
| nC$_4$ | 51 | 349 | 400 | 100 | 300 | 50 | 1 | | 1 | | | | | 2 | | 2 | 49 | 298 |
| iC$_5$ | | 4 | | | | | | | | 4 | 1 | 3 | 51 | 50 | | 50 | 3 | 1 |
| nC$_5$ | 51 | 349 | | | | | 2 | 2 | | 400 | 100 | 300 | 50 | 1 | | 1 | 298 | 49 |
| Total | 102 | 706 | 404 | 101 | 303 | 101 | 53 | 2 | 51 | 404 | 101 | 303 | 101 | 53 | 2 | 51 | 351 | 351 |

The parenthetic numbers indicate correspondingly numbered conduits on the drawing.

Reasonable variations and modification are possible within the scope of the foregoing disclosure, the drawing, and the appended claims to the invention the essence of which is that in separate isomerization zones hydrocarbons of different molecular weight are isomerized, isomers from the respective zones effluents are separately recovered using separate molecular sieves, insufficiently isomerized hydrocarbon is removed from said materials and fractionated in a common zone, the removal being effected by employing a reduced pressure and/or by supplying to the sieve zones recovering the isomers from a given zone at least a portion of the normal hydrocarbon which is being isomerized in another isomerization zone thus obtaining the advantages herein set forth.

I claim:

1. A method for the separate isomerization of hydrocarbons of different molecular weight which comprises in a first isomerization zone isomerizing a normal paraffin-hydrocarbon of a given molecular weight, in a second isomerization zone isomerizing a normal paraffin-hydrocarbon of a molecular weight different from that of said given molecular weight, from each of said isomerization zones passing effluents, respectively, to molecular sieve material containing zones thereby causing adsorption in each of said molecular sieve zones, respectively, of insufficiently isomerized hydrocarbon while yielding from each of said molecular sieve zones a stream containing isomerized hydrocarbon product, removing from each of said molecular sieve zones unisomerized hydrocarbons adsorbed therein by elution of the unisomerized hydrocarbon of said given molecular weight on the sieve material in the zone in which it has been adsorbed, using as eluent, unisomerized hydrocarbon of molecular weight different from that of said hydrocarbon of said given molecular weight and by elution of unisomerized hydrocarbon of said molecular weight different from that of said hydrocarbon of said given molecular weight, using, as eluent, hydrocarbons of said given molecular weight, and passing said unisomerized hydrocarbons, including those used as eluents, to a hydrocarbon separation zone wherein the hydrocarbons are separated according to molecular weight, obtaining hydrocarbons separated according to molecular weight, returning from said separation zone to the said first isomerization zone hydrocarbon of said given molecular weight being isomerized therein and returning from said separation zone to said second isomerization zone hydrocarbon of said different molecular weight being isomerized therein.

2. A method for isomerizing separately n-butane and n-pentane which comprises in a butane isomerization zone isomerizing n-butane and in a pentane isomerization zone isomerizing n-pentane, passing from said isomerization zones to separate molecular sieve zones an isobutane and n-butane effluent and an isopentane and n-pentane effluent, obtaining from said sieve zones, respectively, an isobutane-containing stream removed as a product of the method and an isopentane-containing stream removed as a product of the method, respectively, removing from said molecular sieve zones n-butane and n-pentane adsorbed therein by elution of the adsorbed n-butane from the sieve zone in which it has been adsorbed using as eluent, n-pentane and by elution of the adsorbed n-pentane from the sieve zone in which it has been adsorbed using as eluent, n-butane and passing the removed hydrocarbons including the eluents to a n-butane-n-pentane separation zone, recovering a stream of n-butane and a stream of n-pentane and passing the n-butane stream to the butane isomerization zone and the n-pentane stream to the pentane isomerization zone.

References Cited in the file of this patent

UNITED STATES PATENTS

| | | |
|---|---|---|
| 2,443,607 | Evering | June 22, 1948 |
| 2,818,455 | Ballard et al. | Dec. 31, 1957 |
| 2,859,173 | Hess et al. | Nov. 4, 1958 |
| 2,918,511 | Carter et al. | Dec. 22, 1959 |
| 2,921,104 | Haensel | Jan. 12, 1960 |